United States Patent [19]
Gibson

[11] Patent Number: 5,159,853
[45] Date of Patent: Nov. 3, 1992

[54] TRILATERAL TRACK BICYCLE PEDAL

[76] Inventor: Peter O. Gibson, 6316 Greenspring Ave., #307, Baltimore, Md. 21209

[21] Appl. No.: 838,020

[22] Filed: Feb. 20, 1992

[51] Int. Cl.⁵ .......................... G05G 1/14; A43B 5/00
[52] U.S. Cl. ................................ 74/594.6; 74/594.4; 36/131
[58] Field of Search ................ 36/131, 132; 74/594.4, 74/594.5, 594.6; 280/11.3, 611

[56] References Cited

U.S. PATENT DOCUMENTS

| | | | |
|---|---|---|---|
| 550,409 | 11/1895 | Hanson | 74/594.6 |
| 598,325 | 4/1898 | McIntyre | 74/594.6 |
| 1,393,256 | 10/1921 | Wright | 74/594.5 |
| 2,582,551 | 1/1952 | Malherbe | 36/42 |
| 3,964,343 | 6/1976 | Lauterbach | 74/594.6 |
| 4,214,384 | 7/1980 | Gonzalez | 36/42 |
| 4,538,480 | 9/1985 | Trindle | 74/594.6 X |
| 4,570,363 | 2/1986 | Annovi | 36/132 |
| 4,685,351 | 8/1987 | Pegg | 74/594.4 |
| 4,716,784 | 1/1988 | Schlotterer | 74/594.6 |
| 4,892,009 | 1/1990 | Gibson | 74/594.6 |

FOREIGN PATENT DOCUMENTS

| | | | |
|---|---|---|---|
| 106162 | 4/1984 | European Pat. Off. | 74/594.6 |
| 3602329 | 7/1987 | Fed. Rep. of Germany | 74/594.6 |

Primary Examiner—Rodney H. Bonck
Assistant Examiner—Nicholas Whitelaw
Attorney, Agent, or Firm—Peter Gibson

[57] ABSTRACT

A bicycle pedal has two opposed bilaterally symmetric tracks which are substantially identical. Each track is bounded by an axially disposed central concave surface and two substantially parallel apposed side surfaces. Each side surface extends inward, in equidistant juxtaposition with the central convex surface. Each track is slightly wider at the free end of the pedal than the end fixed to the crank arm. A shoe cleat has a bottom with a longitudinally disposed central concave surface and adjacent flat lateral surfaces as well as upper bilateral cleat side surfaces. The bottom central concave and two upper bilateral surfaces mate with the corresponding pedal track surfaces in an engagement parallel to the pedal axis. Attached to the free end of the pedal is a lead which has an exterior flush with the central convex surfaces of both pedal tracks. The lead tapers bilaterally into fins lying in front of the area between the two opposed pedal tracks. The cleat bottom concave surface, when in contact with the pedal lead, will bias the lead into one of two opposed equilibrium positions wherein the cleat bottom flat lateral surfaces rest on the pedal lead bilateral fins. The lead guides the cleat in longitudinal alignment of the mating surfaces. At full insertion of cleat into the pedal track, the upper bilateral surfaces of the cleat are in full contact with the opposed side surfaces of the pedal and the bottom central concave surface of the cleat is in full contact with the central longitudinal convex surface of the pedal.

10 Claims, 2 Drawing Sheets

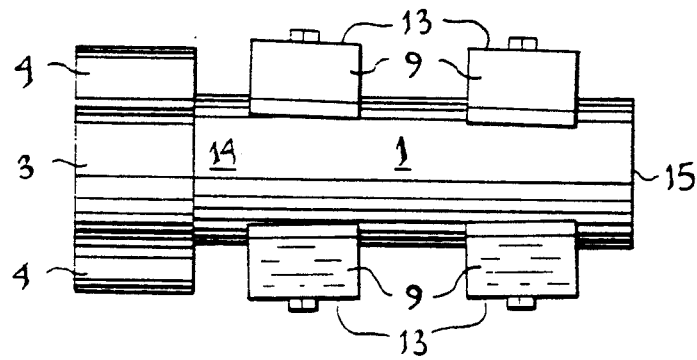
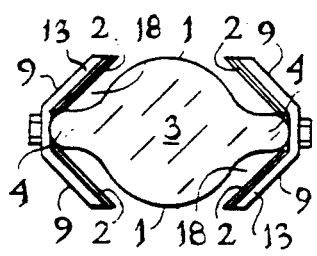
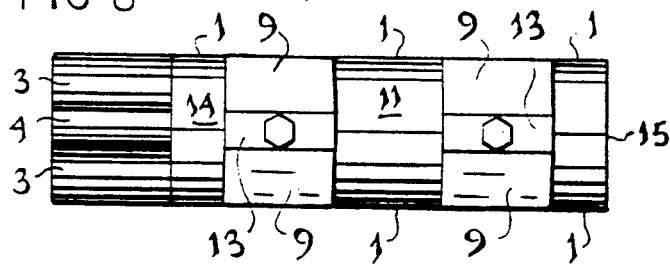
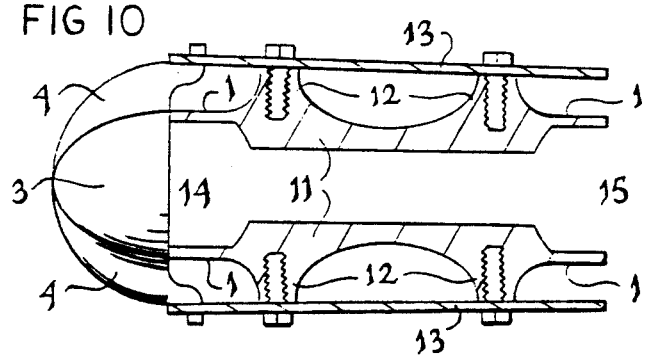
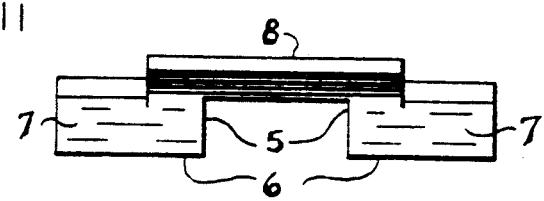

TRILATERAL TRACK BICYCLE PEDAL

BACKGROUND OF THE INVENTION

The current invention relates generally to foot operated pedals, specifically to bicycle pedals and particularly to bicycle pedals operated in conjunction with shoe cleats.

Effective transmittal of torque between shoe and pedal is crucial to cycling efficiency. A compromise with safety is observed. Rigid attachment of shoe to pedal achieves optimal efficiency in enabling transmission of force evenly through full rotation, but totally abandons safety. A platform pedal presents no impediment to safety, but only allows application of force downwards. A toe clip and strap compromises; the tighter the strap, the more efficiency gained and safety sacrificed. Recent 'clipless' style pedal and cleat systems adapted from certain ski bindings require rotation to effect release and involve a similar compromise.

An alternative approach employing longitudinally or axially tracked pedals and shoe cleats shaped for engagement lateral to the bicycle is considered. It enables the secure transmittal of force throughout the full rotation of the crank as well as unimpeded disengagement in a direction normal to the plane of rotation. The practical problem having prevented implementation is matching the rotational orientation of the pedal tracks about the pedal axis with the shoe cleat. One solution places the pedal track below the spindle axis, which maintains a given rotational orientation by virtue of gravity. This denies the use of a full length spindle and outboard bearing however and is mechanically unsatisfactory in regard to normal loading of the structure.

U.S. Pat. # 4,892,009, issued to the present inventor, describes a bicycle pedal which is intended to enable optimal efficiency in the transmission of torque from a cyclist's foot with complete safety that is mechanically reliable. The pedal disclosed therein describes two identical, opposed tracks, each comprised of bilaterally symmetric longitudinally contiguous surfaces with a lead having an ellipsoid shaped head with bilaterally adjacent fins tapering to an apex coincident the longitudinal axis of the pedal. The present invention represents an improvement of the pedal therein described.

SUMMARY OF THE INVENTION

The object of the current invention is the improvement of an effective means for aligning and engaging in a direction lateral to a bicycle either one of two opposed tracks upon a pedal with a suitably shaped shoe cleat. Each track has a central longitudinal convex surface and two distally apposed side surfaces which extend inward. The side surfaces are connected to the central body at least two struts. The pedal's free end has a lead, which, when placed in contact with a concave surface on the bottom of a cleat, is biased to a position of equilibrium which orients the pedal about its axis of rotation and guides the alignment of the cleat with either one of said two opposed tracks.

Lateral insertion, engagement and removal of the cleat into, with and from the pedal are facilitated by a slight angle given the apposed side surfaces of the pedal and of the corresponding cleat surfaces such that the free end track width exceeds that of the fixed end. The cleat has a bottom longitudinal concave central with two laterally adjacent substantially co-planar surfaces and two substantially parallel bilaterally disposed upper surfaces. As the cleat enters a pedal track, the bottom central concave surface follows the central longitudinal convex pedal surface and the upper bilaterally disposed cleat surfaces first follow, then as full insertion is made, are biased against the two apposed side pedal surfaces such that full contact between the three respective pairs of cleat and pedal surfaces is effected.

Four exterior pedal surfaces are disposed substantially parallel the pedal axis and normal to each adjacent exterior surface so the concave bottom cleat surface may easily find one of four pairs of normally disposed surfaces for the stable exertion of force downward on the pedal without the insertion of cleat into pedal track.

BRIEF DESCRIPTION OF THE DRAWINGS

FIG. 7 is a plain elevational view taken from the top of a second preferred embodiment of principles relating to the present invention illustrating the full pedal with longitudinally discontinuous side members and a blunt lead.

FIG. 8 is a plain elevational view taken from the side of a second preferred embodiment of principles relating to the present invention illustrating the full pedal with longitudinally discontinuous side members and a blunt lead.

FIG. 9 is a plain elevational view taken from the free end of a second preferred embodiment of principles relating to the present invention illustrating the full pedal with a blunt lead.

FIG. 10 is a plain elevational view taken from the top of a first preferred embodiment of principles relating to the present invention illustrating a method of construction of the pedal having a cast body and struts with the same and the side members in cross section.

FIG. 11 is a plain elevational view taken from the side of a second preferred embodiment of principles relating to the present invention illustrating a cleat with longitudinally discontinuous mating surfaces.

DETAILED DESCRIPTION OF THE INVENTION

The motion of a bicycle pedal during cycling is composed of constant rotation about a longitudinal axis, the pedal spindle, which is itself describing a constant revolution, at a fixed distance, about the crank axle. The spindle is always normal to the plane of revolution and all useful force is applied perpendicular to the spindle. Optimum efficiency in the transmittal of torque is found in a uniform force applied perpendicular to the longitudinal axis of the pedal in a direction which constantly rotates about the spindle axis in a plane normal to that axis. In order to enable the exertion of consistent torque, the shoe must have an attachment to the pedal which is secure in the plane of revolution. Safe release of this engagement may be effected in a motion perpendicular to the plane of revolution, parallel the longitudinal axis of the pedal.

Figure 1:
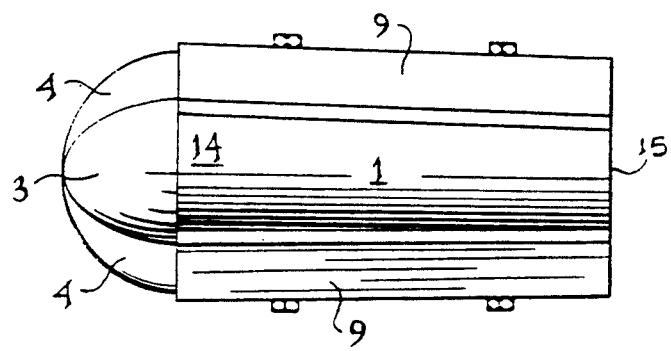
FIG. 1 is a plain elevational view taken from the top of a first preferred embodiment of principles relating to the present invention illustrating a pedal with a continuous central longitudinal surface.
Figure 2:
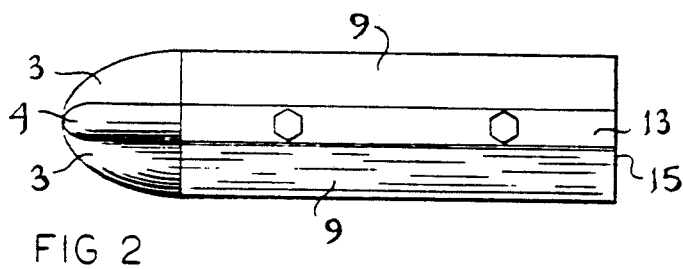
FIG. 2 is a plain elevational view taken from the side of a first preferred embodiment of principles relating to the present invention illustrating a pedal with longitudinally continuous side members.
Figure 3:
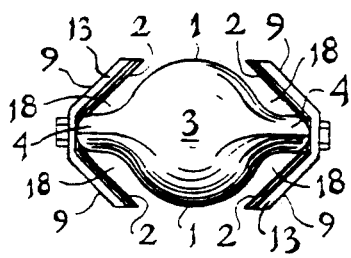
FIG. 3 is a plain elevational view taken from the free end of a first preferred embodiment of principles relating to the present invention illustrating both opposed bilaterally symmetric tracks of a bicycle pedal and a longitudinally tapered lead.
Figure 4:
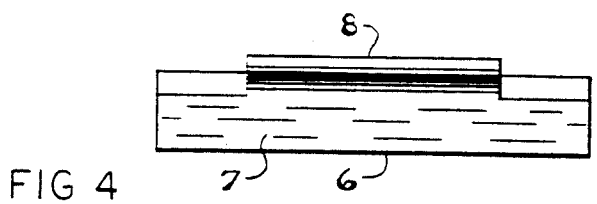
FIG. 4 is a plain elevational view taken from the side of a first preferred embodiment of principles relating to the present invention illustrating a cleat with longitudinally continuous upper lateral surfaces.
Figure 5:
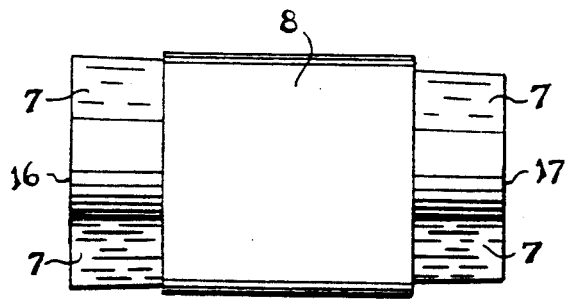
FIG. 5 is an plain elevational view taken from the top of a first preferred embodiment of principles relating to the present invention illustrating a shoe cleat having longitudinally continuous upper lateral surfaces.
Figure 6:
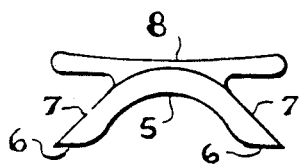
FIG. 6 is a plain elevational view taken from the free end of a first preferred embodiment of principles relating to the present invention illustrating a cleat suitably shaped for lateral engagement of a pedal.

A preferred embodiment of principles relating to the present invention, seen clearly in FIG. 1, FIG. 2 and FIG. 3 is a bicycle pedal which provides for the secure exertion of force in every direction perpendicular to the pedal spindle via a suitably shaped cleat which is seen in FIG. 4, FIG. 5 and FIG. 6. This is achieved by the secure engagement of the pedal with the cleat utilizing three pairs of substantially parallel mating surfaces disposed in a triangular relation when viewed from a direction parallel the longitudinal axis of the pedal, as in FIG. 3. It is considered that this arrangement provides the simplest basic structure for obtaining optimal efficiency in the exertion of torque upon a pedal while enabling complete safety which is attained by motion of the cleat in a direction parallel the spindle, outward from the bicycle.

In a first preferred embodiment of the present invention, the three mating surfaces of the pedal which are engaged by congruent cleat surfaces are: a central convex surface 1 which is parallel to the longitudinal axis of the pedal and describes a longitudinally uniform bilaterally symmetric arc about that axis, and a pair of apposed planar side surfaces 2 which are longitudinally uniform, substantially parallel and in juxtaposition to the central convex surface 1. The apposed side surfaces 2 are given a slight angle with respect to the longitudinal axis such that the distance between the two at the free end 14 of the pedal exceeds the distance between the two at the fixed end 15 of the pedal as seen in FIG. 1 and FIG. 3.

A suitably shaped cleat has three congruent mating surfaces: a central concave surface 5 which describes a bilaterally symmetric longitudinally uniform arc about the longitudinal axis on the bottom of the cleat and a pair of upper side surfaces 7 which are bilaterally symmetric, longitudinally uniform and have a small angle with respect to the longitudinal axis corresponding to that given the apposed pedal side surfaces 2. In addition, the bottom of the cleat has bilateral flat surfaces 6 adjacent the central concave surface 5 which are substantially co-planar and a central top surface 8 suitably shaped for abutment with the sole of a shoe. As seen in FIG. 1 and FIG. 5, the proximal end 17 of the cleat to the pedal is narrower than the distal end 16 and the width of the pedal track 18 is greater at the free end 14 of the pedal than the fixed end 15. This facilitates the action of insertion and removal of the cleat into and from the pedal.

In addition to aiding the movement of the cleat into and out of the pedal, the small longitudinal angle given the apposed side surfaces 2 of the pedal and the two upper lateral surfaces 7 of the cleat fulfill two other functions. In a preferred embodiment of principles relating to the present invention, the width between the apposed side surfaces 2 of the pedal at the fixed end 15 is equal to the width of the cleat between the upper lateral surfaces 7 at the proximal end 17. Similarly, the width of the track 18 between the apposed side surfaces 2 of the pedal at the free end 14 is equal to the width of the cleat between the upper lateral surfaces at the distal end 16, and, with a longitudinally planar surface for all four, the mating surfaces are only in contact and then in full contact only at full insertion of the cleat into a pedal track. Thus, in addition to ease in insertion and removal, both security of engagement and a physical stop assuring correct depth of insertion are provided.

The free end 14 of the pedal is equipped with a lead. As the pedal is free to rotate about the spindle, the rotational orientation of the pedal is uncertain prior engagement by the cleat and must be determined to allow insertion. The function of the lead is to orient the pedal about the rotational axis and provide alignment of the longitudinal axis of the cleat with that of the pedal, thus enabling insertion of the cleat into one of the two opposed tracks of the pedal. The pedal, besides being bilaterally symmetric in a preferred embodiment of principles relating to the present invention, must necessarily have two opposed tracks 18 which are substantially identical when the pedal is rotated 180 degrees about the spindle. Hence the half of the pedal clearly seen in FIG. 1 is precisely the same as that which is obscured, as indicated in FIG. 3.

As seen in FIG. 1, FIG. 2 and FIG. 3, the lead has a head 3 which has a surface flush with the central convex surface 1 of each pedal track 18 and it has a pair of bilateral fins 4 which are disposed immediately in front of the area between the two tracks 18 of the pedal. When a portion of the bottom central concave surface 5 of the cleat, seen in FIG. 6, is brought into contact with the lead alone, the lead will rotate to one of two positions of equilibrium wherein a portion of the central concave cleat surface 5 is in contact with the head 3 of the lead and the two bilateral bottom cleat surfaces 6 are each in contact with one of the fins 4. Furthermore, the head of the lead provides alignment of the cleat with the pedal. Basically, the lead will rotate a maximum of ninety degrees under pressure from the central concave cleat surface to one of two equilibrium positions with the three bottom surfaces of the cleat biased against the lead and then guide the insertion of the cleat into one of two opposed pedal tracks 18.

It is not necessary however, as described above, that longitudinally uniform surfaces be employed for mating cleat with pedal. In the first preferred embodiment described above, both pedal and cleat have longitudinally uniform mating surfaces. However, in a second preferred embodiment of principles relating to the present invention, as seen in FIG. 7 and FIG. 10, the central longitudinal convex pedal surface 1 and or the two apposed side surfaces 2 may be interrupted, as it were, or discontinuous longitudinally. Similarly, as seen in FIG. 5, the bottom central concave cleat surface 5 and or the upper lateral cleat surfaces 7 and or the two bilateral bottom cleat surfaces 6 need not be longitudinally continuous. Any one or any combination of these eleven (3 per pedal track & 5 cleat) surfaces may be so interrupted. While it would be advisable to mate discontinuous with continuous surfaces, mating opposed discontinuous surfaces would work also.

Furthermore, it is not necessary that the lead be shaped as shown in FIG. 1 and FIG. 2 wherein the head 3 and fins 4 taper to an apex which is coincident the longitudinal axis of the pedal. In a second preferred embodiment of principles relating to the present invention, as seen in FIG. 7 and FIG. 8, the head 3 of the lead and or the fins 4 may be blunt. Any degree of intermediate longitudinal taper would work well also. Nor is it necessary that a form of blunt nosed lead be associated with use of a discontinuous mating surface, of either pedal track and or cleat, either. Any combination of these elements can be satisfactorily utilized.

It is another aspect of a preferred embodiment of principles relating to the present invention that provision be made to facilitate the exertion of force upon the exterior of the pedal without insertion of the cleat into one of the pedal tracks 18. This is especially useful during mounting of the bicycle. It is considered that the exterior of the pedal, as seen in FIG. 1, FIG. 2 and FIG. 3 presents four exterior side surfaces 9 which are substantially parallel to the longitudinal axis of the pedal but have an angle given with respect to the plane through the longitudinal axis dividing the two opposed pedal tracks 18. If this given angle is forty-five degrees, these four exterior pedal surfaces 9 are substantially normal to one another. If, further, the distance between the edges of any two adjacent said exterior surfaces 9 is less than the span of the bottom central concave cleat surface 5, then this surface of the cleat may straddle the space between any said two adjacent exterior pedal surfaces while in contact with both said adjacent exterior surfaces, and further, by virtue of the symmetry of the pedal construction, find an equilibrium position with respect to the pedal spindle which will enable a stable basis for the exertion of force.

Construction of a preferred embodiment of the present invention involves a casting of the body 11 and struts 12 in one piece as seen in FIG. 10. The apposed side surfaces 2 of the pedal are preferably given by stainless or spring steel side members 13, either longitudinally continuous as seen in FIG. 1 and FIG. 2 or in an interrupted fashion depicted in FIG. 7 and FIG. 8. And it is suggested that the body and struts, either cast in a piece or assembled of separate members, be made of an aircraft grade aluminum alloy. Manufacturing the side members 13 seen in FIG. 1, FIG. 2, FIG. 3, FIG. 7, FIG. 8, FIG. 9 and FIG. 10 from a sheet of stainless or spring steel is recommended to provide some flexibility so that when the cleat is fully inserted into a pedal track 18 the two apposed side mating surfaces 2 of the pedal will flex to accommodate full contact with the mating cleat surfaces and some tension will be provided between the apposed side pedal surfaces 2, seen in FIG. 3, and the upper lateral cleat surfaces 7 seen in FIG. 5, FIG. 6, FIG. 9 and FIG. 11.

The body, in any case, must be machined, as seen in FIG. 10, to receive standard bearing cups in a press fit and races which are employed with a standard spindle in perfectly routine industry practice. The attachment of the flexible steel side members 13 to the struts 12, and of the struts to the body 11, if these two are not cast as a single piece, is by any suitable means. Riveting, in the cast of a cast body and struts, is suggested and bolts running freely through the struts, threading into the body in the case of separate body and strut members, is considered satisfactory though it is recommended that steel thread inserts be used in this last instance. If the struts are cast with the body, bolts running through the flexible side members and threading into the struts would also be quite satisfactory, as depicted in FIG. 10. It is recommended that the flexible side members be formed on a brake press from steel sheet of an appropriate gauge: approximately on sixteenth of an inch thickness is suggested.

The pedal lead is preferably cast in either an aluminum alloy or a hard plastic. The attachment of the lead to the body of the pedal is somewhat problematic in comparison with the balance of the construction which is extremely straightforward. It is suggested that extensions of the fins alongside the side members be trapped by the side members, as seen in FIG. 10. In conjunction with the bolted construction depicted, removal of the lead and exposure of the outboard bearing race is feasible. The standard method of threading a dust cap into the free end of the pedal body may be satisfactory for attachment of the lead, but an assurance that the fins will line up in their correct bilateral positions must be implemented. It is also considered that many pedals today are made with sealed bearings and that a simple press fit, welding or gluing of the lead head to the body would be satisfactory in this case.

The necessary shaping of the cleat, particularly of the top surface abutting the shoe sole, recommends a casting in either aluminum or a hard plastic. The cleat could be easily machined with the exception of this surface and a machined piece, of aluminum alloy, might be used with a layer of resilient material between it and the shoe sole. In this latter method of construction a formed steel cleat is also easily envisaged by the routinier.

The only critical aspect in the construction of both the cleat and the pedal is the fit of the two together. The angle given the apposed side surfaces of the pedal and the upper lateral cleat surfaces must be rather precisely identical and the corresponding widths must be closely matched as well. A value of approximately one half a degree from parallel to the longitudinal axis is recommended for the angle of all six, (2 per pedal track, 2 cleat), planar mating surfaces. This angle can be rather easily achieved simply by facing the struts with an end mill set at the desired angle and employing the identical machine set-up with appropriate fixturing for milling the upper lateral cleat surfaces.

While the foregoing is specific to first and second preferred embodiments of principles relating to the present invention, it is understood that the foregoing description is in no way restrictive of the rights which are secured by Letters Patent, for which I hereby claim:

1. A bicycle pedal enabling engagement by a cleat in a direction lateral to the bicycle;
    said pedal having a longitudinal axis, a central body, one free end and one fixed end, a lead attached to said body at said free end and two substantially identical opposed tracks disposed parallel to said longitudinal axis;
    said central body being disposed longitudinally, enclosing said longitudinal axis and further having two opposed longitudinally disposed convex surfaces which are symmetrically arcuate about said longitudinal axis and terminate at said pedal free and fixed ends;
    each said track being bounded by a set of surfaces comprising one of said two central longitudinally disposed convex surfaces and two apposed laterally distal planar side surfaces each projecting inwardly, juxtaposed to said central longitudinally disposed convex surface each said distal planar side surface connected to the central body by at least two struts;

said lead having a central head and two lateral fins, said central head having an exterior surface flush each said opposed central longitudinally convex surfaces and said two lateral fins being disposed in front of the area between said two substantially identical opposed tracks.

2. A pedal in accordance with claim 1 wherein each said substantially identical track parallel said longitudinal axis is bilaterally symmetric about said longitudinal axis.

3. A pedal in accordance with claim 1 wherein said central convex surface is longitudinally continuous.

4. A pedal in accordance with claim 1 wherein at least one of said two apposed side surfaces is longitudinally continuous.

5. A pedal in accordance with claim 1 wherein said lead head and fins taper longitudinally to an apex coincident said pedal longitudinal axis.

6. A pedal in accordance with claim 1 wherein the width of each said track is slightly greater at said free end than said fixed end.

7. A pedal in accordance with claim 6 wherein each said apposed side surface is disposed substantially parallel to each other and the distance between said two apposed side surfaces at the free end of the pedal exceeds the distance between said two apposed side surfaces at the fixed end of the pedal.

8. A pedal in accordance with claim 1 having four exterior surfaces substantially parallel to said longitudinal axis.

9. A pedal in accordance with claim 8 wherein each of said four exterior surfaces is disposed substantially perpendicular to each adjacent exterior surface.

10. A pedal in accordance with claim 9 wherein each said exterior surface is substantially disposed at an angle of forty-five degrees with respect to a plane through said longitudinal axis between said two opposed tracks.

* * * * *